US007008498B2

(12) United States Patent
Lamport

(10) Patent No.: US 7,008,498 B2
(45) Date of Patent: Mar. 7, 2006

(54) COATING METHOD FOR DISC BRAKE PADS

(75) Inventor: Robert Anthony Lamport, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 327 days.

(21) Appl. No.: 10/418,777

(22) Filed: Apr. 18, 2003

(65) Prior Publication Data

US 2004/0206441 A1      Oct. 21, 2004

(51) Int. Cl.
*B32B 31/12* (2006.01)
*F16D 69/02* (2006.01)

(52) U.S. Cl. .................. 156/245; 156/279; 188/251 A
(58) Field of Classification Search ................ 156/245, 156/279
See application file for complete search history.

(56) References Cited

U.S. PATENT DOCUMENTS 4,197,352 A * 4/1980 Emmett et al. ............. 428/409
5,398,784 A * 3/1995 Haneda et al. ........ 188/218 XL
5,686,144 A   11/1997 Thebault et al. ............ 427/282
5,725,955 A    3/1998 Tawil et al. ................ 428/408
6,298,953 B1  10/2001 Bunker
6,376,431 B1   4/2002 Matsumoto et al. ........ 508/107
6,497,307 B1 * 12/2002 Schoo et al. ............ 188/251 A
6,508,338 B1   1/2003 Bunker
2002/0033315 A1  3/2002 Yamane ..................... 192/107

* cited by examiner

*Primary Examiner*—Sam Chuan Yao
(74) *Attorney, Agent, or Firm*—Michael D. Smith

(57) ABSTRACT

A method of coating disc brake pads to obscure and seal minor surface imperfections, thereby reducing scrap rates. A preform of friction lining material is coated prior to molding and curing the preform and bonding the same to the backing plate to form the brake pad assembly. The preform is coated with an aqueous composition containing a solids mixture of 5–50 vol. % resin and 50–95 vol. % non-resin solids. Advantageously, the coating composition has a 5–30 vol. % solids mixture content, which solids mixture includes 15–25 vol. % resin, 0–10 vol. % powdered elastomer, 5–15 vol. % carbon black, 20–50 vol. % inorganic fillers, 5–15 vol. % organic fibers and 1–10 vol. % inorganic flake material.

20 Claims, 2 Drawing Sheets

COATING METHOD FOR DISC BRAKE PADS

TECHNICAL FIELD

This invention relates to a method of coating brake pads, in particular, coating the friction material preform prior to molding and curing to form the friction lining of the brake pad.

BACKGROUND OF THE INVENTION

Friction members used as disc pads for disc brakes and related applications in equipment such as automobiles are typically manufactured by bonding a friction material preform to a backing plate (or shoe) that has been coated with adhesive, while molding and curing the preform within a mold, and subsequently post-curing (heat treating), grit blasting, painting, baking and grinding the assembly so as to give a finished brake pad in which the friction material is bonded to the surface of the backing plate. More specifically, and with reference to FIG. 1, there is shown schematically the basic steps used in a typical prior art method of forming a brake pad. A dry blend or wet slurry of friction material is pressed at room temperature. When using a wet slurry, the preform must then be dried, for example, in a forced air oven. This preform is about 1–2 cm thicker than the final desired thickness dimension for the friction lining. During the room temperature press, surface cracks and flaws may be formed, but are generally of little depth. The dry preform and a backing plate are then placed in the die cavity of, for example, a platen press, a rotary hot eject integrally molded apparatus, a book mold or a positive cavity mold to mold the preform to the final desired thickness, to substantially cure the friction material, and to bond the friction lining to the backing plate by the application of heat and pressure to form a brake pad assembly. The backing plate may first be roll-coated with an adhesive, for example, or the backing plate may be supplied pre-coated with an adhesive to facilitate bonding of the friction lining to the backing plate. The friction material is then post-cured to cure any remaining uncured resin.

During molding and curing, additional surface flaws and cracks may be created due to the temperature differential that occurs between the outer portion of the lining and the inner portion of the lining. A brittle layer (or skin) tends to form initially on the outside, while the inner portion of the lining remains uncured. To minimize the flaws and cracks created by the differential heating, the molding step is generally performed by several repetitions of applying pressure then out-gassing to allow the pad to breathe. The outer brittle layer may nonetheless develop hairline cracks during the later pressing steps.

A brake pad must be scrapped if it contains a flaw that will result in failure of the lining during use. While internal defects and deep flaws and cracks may produce catastrophic failure, minor surface cracks and flaws of little depth will not likely result in catastrophic failure and need not result in scrapping of the part. However, an observer may not be able to ascertain whether the crack or flaw is deep or a mere surface imperfection. Thus, brake pads have typically required painting (also referred to as "coating") after post-curing because painting hides or reduces minor surface molding imperfections that may be mistaken for deep cracks, such that unnecessary scrapping of the brake pads is reduced. Painting may be accomplished by spray painting, dip coating or powder coating. Spray coatings use a solvent, which is undesirable. Dip coatings apply uneven coatings that create dimensional tolerance problems for the brake pad. Both spray and dip coatings also require a drying step. Powder coating is currently the predominant method for painting the brake pads, which requires that a conductive material be sprayed on the pad first, then dried, to put a charge on the pad, followed by application of the powder, as shown in FIG. 1. The brake pad is then baked to form the coating. This process requires numerous steps, but is solvent-free and capable of providing a uniform coating.

In addition to reducing the appearance of the surface imperfections on the lining such that unnecessary scrapping of parts is reduced, the brake pads require painting after post-curing for several other reasons. One reason is cosmetic, in that the coating typically contains carbon black, or other pigment, and therefore provides a uniform appearance to the friction lining and backing plate. Other reasons for painting include sealing the porous outer surface of the lining to reduce water absorption and to improve edge code stencil visibility.

As stated, the painting is intended to hide or reduce minor surface imperfections. However, powder, spray and dip paint coatings cannot be applied thick enough to completely fill in and smooth these surface imperfections without exceeding the permitted thickness dimensions for the brake pad. In addition, the paints typically include a majority of epoxy or phenolic resin with about 10–15% carbon black and low filler content. These paints produce a thin, shiny coating that is not very effective in filling in and sealing surface imperfections, but rather, often tends to highlight or accentuate the surface imperfections, thereby potentially increasing scrap rates. Thus, current painting methods for disc brake pads include significant capital investment for the painting equipment, particularly for powder coatings, and involves a significant time expenditure to effect the painting, only to have many parts scrapped because the painting is insufficient at hiding and reducing minor surface imperfections.

There is thus a need for a method of painting (coating) brake pads that is effective in filling in and sealing minor surface imperfections to reduce scrap rate in a manner that is time and cost effective.

SUMMARY OF THE INVENTION

The present invention provides a method of coating disc brake pads to obscure, seal, fill, prevent and/or eliminate minor surface imperfections during molding and curing, thereby reducing scrap rates, rather than attempting to hide surface imperfections by post-cure painting. To this end, a preform of friction lining material is coated prior to molding and curing the preform and bonding the same to the backing plate to form the brake pad assembly. The preform is coated with an aqueous composition containing a solids mixture of 5–50 vol. % resin and 50–95 vol. % non-resin solids. Advantageously, the coating composition has a 5–30 vol. % solids mixture content. Also advantageously, the solids mixture includes 15–25 vol. % resin, 0–10 vol. % powdered elastomer, 5–15 vol. % carbon black, 20–50 vol. % inorganic fillers, 5–15 vol. % organic fibers and 1–10 vol. % inorganic flake material. The coating composition not only fills in and eliminates surface imperfections created during preforming, but also reinforces the friction material during molding and curing and prevents additional creation of surface flaws.

BRIEF DESCRIPTION OF THE DRAWINGS

The present invention will now be described, by way of example, with reference to the accompanying drawings, in which.

DETAILED DESCRIPTION

Figure 1:
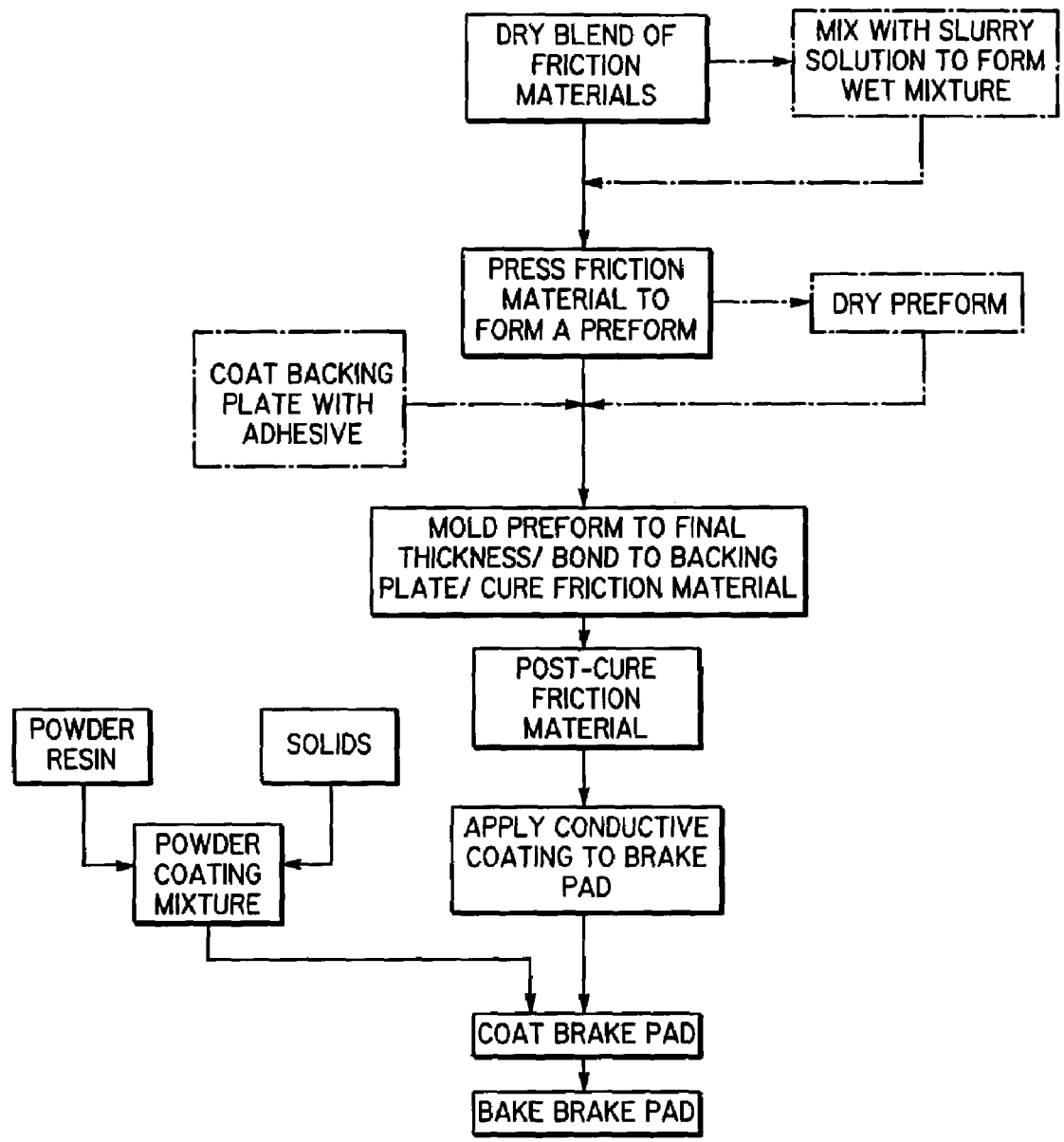
FIG. 1 is a schematic block diagram depicting a method of the prior art for making painted brake pads.

The present invention provides a method of coating disc brake pads in which the preform of friction lining material is coated or painted prior to molding and curing the preform and bonding to the backing plate to form the final friction lining. The coating composition comprises water and a solids mixture of 5–50 vol. % resin and 50–95 vol. % non-resin solids. The high solids content in the coating composition is effective in sealing minor surface imperfections and providing a uniform surface appearance. Moreover, because the coating is applied prior to bonding to the backing plate and molding and curing, dimensional tolerances for the brake pad are maintained.

While prior paint compositions typically included a low solids content, including fine powders and no fibers, with a high epoxy or phenolic resin content, the coating composition of the present invention comprises water and a solids mixture of resin with 50–95 vol. % non-resin solids that includes fillers, flakes and/or fibers. The solids mixture is highly compatible with the friction lining material, which also comprises fillers, flakes and/or fibers. Because of the high solids content, and because the coating is applied to the preform instead of the molded brake pad, the coating may be applied thicker than traditional paint compositions, and the solids are effective in filling in cracks and other imperfections. The coating also has the benefit of being able to flow, densify and cure under pressure, and thus, reinforces the friction material.

The non-resin solids portion of the solids mixture includes 2–15 vol. % carbon black to provide the cosmetic appearance desired by customers and to provide the dark color that helps obscure surface imperfections. While carbon black is preferred, any alternative pigment may be used.

The non-resin solids portion of the solids mixture further includes 2–15 vol. % organic staple or pulp fiber. The staple fibers may have a length of about 2–15 mm and may be, for example, para-aramid fibers, polyacrylonitrile (PAN) fibers, melamine fibers, pitch-based carbon/graphite fibers (pitch), oxidized/carbonized/graphitized polymer precursor fibers or polybenzimidazole (PBI) fibers. It may be understood that pitch fibers are produced from the sludge left over after distilling petroleum crude or coal. When sufficiently heated, most of the remaining long chain hydrocarbons are driven off, and what remains is carbon, which can be extruded into filaments. If heated in a vacuum at a sufficiently high temperature, the glassy carbon may be converted to a graphitic structure. The oxidized/carbonized/graphitized polymer precursor fibers may be understood to refer to carbon fibers produced with a high carbon content polymer precursor, such as PAN, where the fibers are spun into a continuous filament, then oxidized to stabilize the polymer. Higher temperatures and inert atmosphere may result in even higher carbon content to carbonize the polymer precursor, and even further heat treatment will produce graphite fiber. Exemplary fibers include PANEX® products available from Zoltek Corp. The pulp fiber may have a fiber length up to 8 mm, and advantageously ¼–4 mm. The organic pulp fibers may be, for example, para-aramid, PAN or oxidized PAN. It may be appreciated that pulp refers to cellulose fibers or fibrillated synthetic fibers. Exemplary pulps include Kevlar® products available from E.I. du Pont de Nemours (Wilmington, Del.) or Twaron® products available from Teijin Twaron (Japan) (previously from Enka B. V. Corp.).

The non-resin solids content of the solids mixture of the coating composition further includes up to 50 vol. % inorganic fillers, and advantageously 20–50 vol. %. These filler particles generally have a diameter less than 0.05 mm, and may include such materials as potassium titanates (potassium hexatitanate, potassium octatitanate, potassium trititanate, potassium magnesium titanate, potassium lithium titanate, etc.), zirconium silicate, zirconia, barium sulfate, calcium carbonate and various other ceramic materials.

The non-resin solids content of the solids mixture of the coating composition may further comprise 0–15 vol. % inorganic flake material, and advantageously, 1–10 vol. %. The flake materials have a diameter, as measured in the largest diameter, of ½–10 mm, and may, for example, comprise delaminated mica, vermiculite, or graphite. Mica products, for example, are available from Suzorite Mica Products, Inc. (Canada).

The non-resin solids content of the solids mixture of the coated composition may further include up to 15 vol. % powdered elastomer, such as powdered rubber, and advantageously, 0–10 vol. %. The optimal content of these powdered substances may depend, at least in part, on the elasticity of the selected resin. More flexible resins may require a lesser amount of powdered elastomer, or may eliminate the need for their inclusion altogether.

The solids mixture of the coating composition also comprises 5–50 vol. % resin, and advantageously, 15–25 vol. %. The resin advantageously includes a phenolic resin, straight or partially modified, and may also include rubber. Examples include MBS rubber-modified phenolic resin, acrylic-modified phenolic resin, or polyvinyl buteryl-modified phenolic resin. In an exemplary embodiment of the present invention, the resin is a liquid resin, where upon blending of the solids mixture and water, foam is produced, which aids in evenly coating the preform. One example of a liquid resin is a nitrile rubber/phenolic resin water-based adhesive. In a further exemplary embodiment, the liquid resin is essentially free of anti-foaming agents. By essentially free, it is meant that the liquid resin contains less than 1 vol. % anti-foaming agents. Other examples of resins that may be suitable for use in the coating composition of the present invention include formaldehyde resin, melamine resin, epoxy resin, acrylic resin, aromatic polyester resin or urea resin, polyamide resin, polyphenoline-sulfide resin, polyether resin, polyimide resin or polyether-ether-ketone resin.

Figure 2:
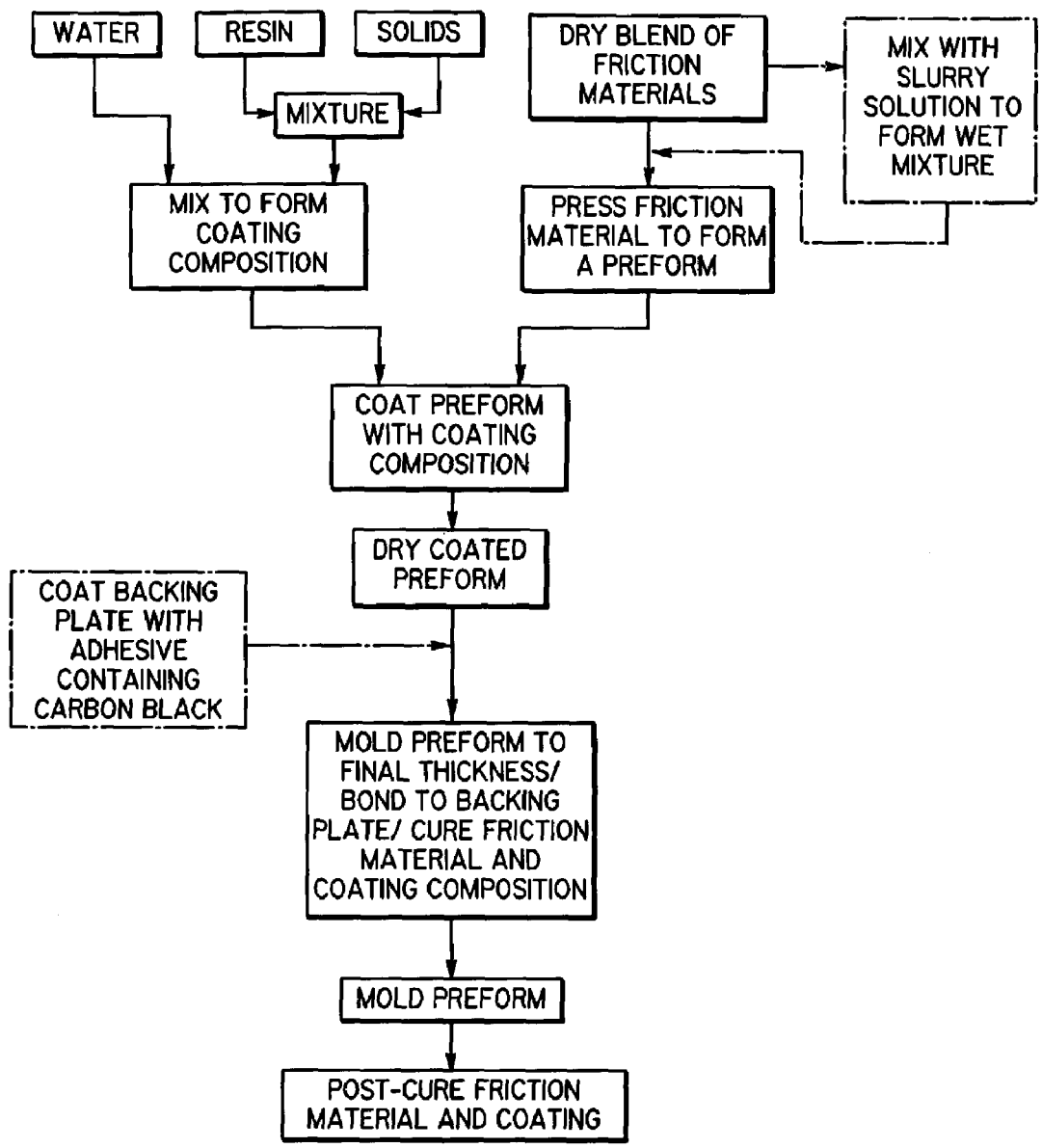
FIG. 2 is a schematic block diagram of a method of the present invention for making painted brake pads.

With reference to FIG. 2, there is shown schematically the basic steps of the method of the present invention. A dry blend of friction material is pressed, typically at room temperature, to form a preform. Optionally, the friction material may be first mixed with a slurry solution to form a wet friction material mixture, and the wet mixture is pressed to form the preform. For example, U.S. patent application Ser. No. 10/375,748 entitled SLURRY COMPOSITION AND METHOD FOR FORMING FRICTION MATERIAL THEREFROM, filed Feb. 26, 2003, discloses an exemplary water slurry friction material and method, which disclosure is incorporated herein by reference in its entirety.

In a separate step, the coating composition is formed by mixing 5–50 vol. % resin with 50–95 vol. % non-resin solids to form a solids mixture, which is then mixed with water, and advantageously the coating composition produces a foam upon blending. The preform is then coated with the aqueous coating composition, advantageously by dipping the preform in the coating composition. The coated preform is then dried, which includes drying of both the coating and the preform in those methods in which a wet slurry of friction material is used to form the preform.

Prior to placing the dried and coated preform and backing plate into a mold cavity, the backing plate may be coated with an adhesive to effect the bond to the friction lining during molding and curing. If desired, the backing plate may be supplied pre-painted, such as with a carbon black-containing coating already on the backing plate, which has an adhesive component that is activated during the molding and curing step. For example, an adhesive coating may be partially pre-cured, such that during molding and curing, the uncured portion of the adhesive bonds with the uncured friction material in the preform and the two resin components are concurrently cured within the die cavity.

The dried and coated preform is then placed into the die cavity of, for example, a platen press, a rotary hot eject integrally molded apparatus, a book mold or a positive cavity mold together with a backing plate to mold the preform to the final desired thickness, to substantially cure the friction material, and to bond the molded friction material to the backing plate. The molding, curing and bonding is achieved by the application of heat and pressure within the die cavity. During the molding, curing and bonding step, 90–95% of the resin is generally cured, though the extent of curing may vary. The molded brake pad assembly is then removed from the die cavity and post-cured or heat treated to cure any remaining uncured resin in the friction material.

Because it is during the molding, curing and bonding step that the friction lining is formed to the desired thickness dimensions for the customer's specifications, and there is no coating applied after the molding, curing and bonding step in the method of the present invention, the dimensional tolerances are maintained for the brake pad. The coating of the preform prior to molding and curing does not effect the dimensional tolerances created during the molding and curing step. Also, when using a wet slurry of friction material to form the preform, followed by coating, only a single drying step is needed during which both the preform and coating are dried. In contrast, in the prior art, the preform would be dried before molding and curing and then the molded and cured brake pad would be subjected to pre-coating and drying to increase the conductivity of the pad, and then painting, drying and baking to form the coating. In addition, the low resin content in the coating composition of the present invention reduces the formation of an outer brittle layer during molding and curing, thereby reducing the formation of cracks and minor surface imperfections that tend to form in brittle layers. Thus, by coating the preform prior to molding and curing rather than the prior art method of coating the molded brake pad, the coating composition fills in the surface flaws created during formation of the preform, and reduces the formation of a brittle layer during molding and curing which contributes to the production of further surface flaws.

In a first example of the present invention, 8 vol. % aramid pulp, 14 vol. % carbon black, 10 vol. % powdered rubber and 43 vol. % inorganic filler were mixed with 25 vol. % powdered resin to form a solids mixture, which was then blended with water to form an aqueous coating composition having 11 vol. % solids content. A wet slurry of friction material was pressed to form a preform, which was then dip coated in the coating composition. The preform and coating were then dried and placed in a die cavity with a pre-coated backing plate. The preform/backing plate assembly was molded, cured and bonded, followed by post-curing. The brake pads were then subjected to shear tests, and their appearance examined for visible surface flaws. The visible inspection revealed nice, even coatings with significant obscuring of surface flaws. The coatings filled in large preform creases that might otherwise have caused the preform to be scrapped even prior to the molding step, and the creases and cracks remained sealed with the coating composition after curing and post-curing. For coating compositions that contained a majority potassium titanate inorganic filler with a small amount of barium sulfate inorganic filler and a MBS-modified phenolic resin, shear occurred, on average, at about 2699 pounds, with shearing occurring entirely at the bond between the friction lining and backing plate. For the same inorganic filler but using a polyvinyl buteryl-modified phenolic resin, acrylic-modified phenolic resin, or unmodified phenolic resin, the shear strength decreased, but was still at a value acceptable for front and rear brake pads. For coating compositions containing the MBS-modified phenolic resin with a 100% barium sulfate inorganic filler, shear occurred, on average, at 4252 pounds, with shearing occurring entirely within the friction lining material rather than at the bond between the friction lining and backing plate.

In a second example of the present invention, 15 vol. % oxidized PAN staple fiber, 13–14 vol. % carbon black, 10 vol. % powdered rubber, 5 vol. % mica flake and 33–36 vol. % inorganic filler were mixed with 20–24 vol. % liquid resin. The mixture was again blended with water and the wet preform dipped in the aqueous coating composition, dried, molded, cured, bonded to a backing plate and post-cured. Visible inspection revealed a very uniform coating with excellent dispersion of fiber and sealing of cracks and other surface imperfections. Shear occurred within the coating layer of the friction lining rather than at the bond between the friction lining and brake pad, but at a lower shear strength than the brake pads of example 1.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A method of coating disc brake pads comprising a backing plate and a friction lining, the method comprising the steps of:
   coating a preform of friction lining material with a coating composition comprising water and a solids mixture of 5–50 vol. % resin and 50–95 vol. % non-resin solids;
   drying the coated preform; and
   molding and curing the coated preform, and bonding the coated preform to a backing plate, to form a brake pad having a friction lining of final desired thickness.

2. The method of claim 1 further comprising, prior to coating the preform:
   forming a wet mixture of the friction lining material and a slurry solution, and pressing the wet mixture to extract at least a portion of the shiny solution to form a wet preform of thickness greater than the final desired thickness of the friction lining,
wherein the step of drying is sufficient to dry the wet preform and the coating composition.

3. The method of claim 1 wherein the non-resin solids of the solids mixture comprise:
0–15 vol. % powdered elastomer;
2–15 vol. % carbon black;
0–50 vol. % inorganic fillers;
2–15 vol. % organic fibers; and
0–15 vol. % inorganic flake material.

4. The method of claim 3 wherein the non-resin solids of the solids mixture comprise:
0–10 vol. % powdered elastomer;
5–15 vol. % carbon black;
20–50 vol. % inorganic fillers;
5–15 vol. % organic fibers; and
1–10 vol. % inorganic flake material.

5. The method of claim 1 wherein the solids mixture comprises 15–25 vol. % resin.

6. The method of claim 1 wherein the resin includes a liquid phenolic resin.

7. The method of claim 6 wherein the resin includes rubber.

8. The method of claim 6 wherein the resin is essentially free of anti-foaming agents.

9. The method of claim 1 wherein the backing plate is coated with a carbon black-containing adhesive prior to bonding the coated preform.

10. The method of claim 1 wherein the coating composition comprises 70–95 vol. % water and 5–30 vol. % of the solids mixture.

11. A method of coating disc brake pads comprising a backing plate and a friction lining, the method comprising the steps of:
forming a wet mixture of a friction lining material and a slurry solution;
pressing the wet mixture to extract at least a portion of the slurry solution to form a wet preform of thickness greater than a final desired thickness of the friction lining;
coating the wet preform with a coating composition comprising 70–95 vol. % water and 5–30 vol. % of a solids mixture of 5–50 vol. % resin and 50–95 vol. % non-resin solids;
drying the coated preform; and
molding and curing the coated preform, and bonding the coated preform to a backing plate, to form a brake pad having the friction lining of final desired thickness.

12. The method of claim 11 wherein the non-resin solids of the solids mixture comprise:
0–15 vol. % powdered elastomer;
2–15 vol. % carbon black;
0–50 vol. % inorganic fillers;
2–15 vol. % organic fibers; and
0–15 vol. % inorganic flake material.

13. The method of claim 12 wherein the non-resin solids of the solids mixture comprise:
0–10 vol. % powdered elastomer;
5–15 vol. % carbon black;
20–50 vol. % inorganic fillers;
5–15 vol. % organic fibers; and
1–10 vol. % inorganic flake material.

14. The method of claim 11 wherein the solids mixture comprises 15–25 vol. % resin.

15. The method of claim 11 wherein the resin includes a liquid phenolic resin.

16. The method of claim 15 wherein the resin includes rubber.

17. The method of claim 15 wherein the resin is essentially free of anti-foaming agents.

18. The method of claim 11 wherein the backing plate is coated with a carbon black-containing adhesive prior to bonding the coated preform.

19. A method of coating disc brake pads comprising a backing plate and a friction lining, the method comprising the steps of:
forming a wet mixture of a friction lining material and a slurry solution;
pressing the wet mixture to extract at least a portion of the slurry solution to form a wet preform of thickness greater than a final desired thickness of the friction lining;
coating the wet preform with a coating composition comprising 70–95 vol. % water and 5–30 vol. % of a solids mixture comprising: 15–25 vol. % liquid phenolic-based resin; 0–10 vol. % powdered elastomer; 5–15 vol. % carbon black; 20–50 vol. % inorganic fillers; 5–15 vol. % organic fibers; and 1–10 vol. % inorganic flake material;
drying the coated preform; and
molding and curing the coated preform, and bonding the coated preform to a backing plate having a carbon black-containing coating thereon, to form a brake pad having the friction lining of final desired thickness.

20. The method of claim 19 wherein the resin is essentially free of anti-foaming agents.

* * * * *